Dec. 16, 1930. J. C. CROWLEY 1,784,821
CONNECTING DEVICE FOR FLUID PRESSURE HOSE
Filed Feb. 15, 1928
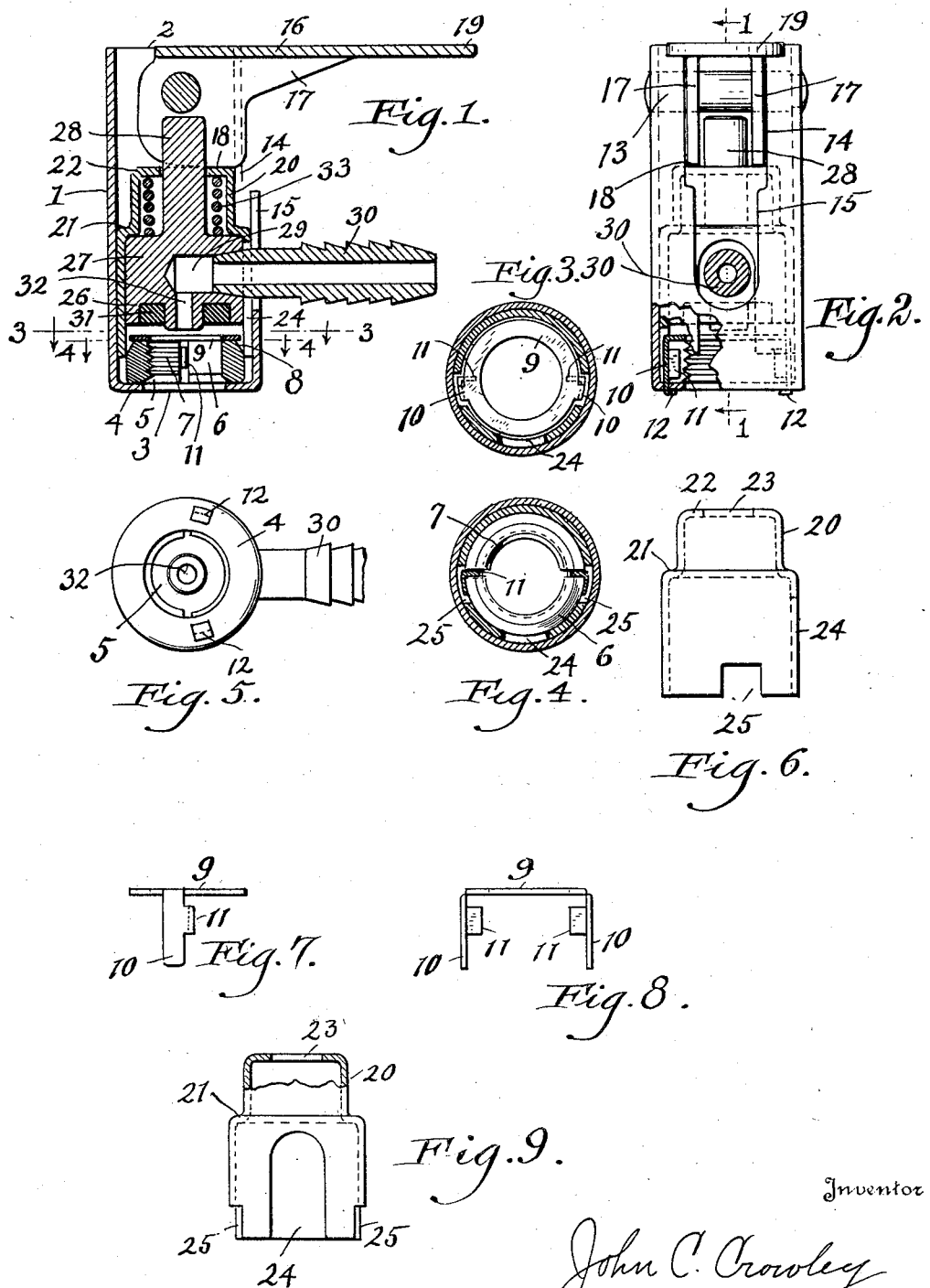

Patented Dec. 16, 1930

1,784,821

UNITED STATES PATENT OFFICE

JOHN C. CROWLEY, OF CLEVELAND HEIGHTS, OHIO, ASSIGNOR TO THE DILL MANUFACTURING COMPANY, OF CLEVELAND, OHIO, A CORPORATION OF OHIO

CONNECTING DEVICE FOR FLUID-PRESSURE HOSE

Application filed February 15, 1928. Serial No. 254,341.

This invention relates to a device for connecting a fluid pressure supply hose with another member; as for example, connecting an air hose to the inlet valve stem of a receptacle adapted to receive air under pressure.

The device has particular utility in connecting an air pressure supply hose with the valve stem of a pneumatic tire although, of course, it is susceptible of use in other relationships.

It is desirable to provide means for connecting a fluid pressure supply hose with another member wherein the connected parts will be tightly joined and the connection maintained without manually holding such parts in joined relationship. This is especially true in the instance of fluid pressure supply lines adapted to be connected to the inlet valve stems of certain receptacles wherein the valves for preventing escape of the fluid from the supply lines are located away from such point of connection.

An object of this invention is to provide a device for connecting a fluid pressure supply hose with another member that may be readily clamped to such member in operative connection, thus avoiding the necessity of manually holding the parts together.

A further object is to provide a device for connecting a fluid pressure supply hose to another member wherein an efficient and tight connection may be made to obviate any leakage of the fluid at the connection.

Another object is to provide a device of this nature which is compact, simple, economic to manufacture, formed of a few number of parts, and is of a strong and durable construction.

Additional objects and advantages will become apparent as the description proceeds.

An embodiment of the invention is illustrated in the accompanying drawings, wherein Fig. 1 is a transverse vertical section taken on line 1—1 of Fig. 2, the parts of the chuck being shown in contracted or closed position;

Fig. 2 is an elevational view of the device, a portion of the casing being broken away in the lower left-hand corner of the figure so as to show certain of the structural parts of the device;

Figs. 3 and 4 are horizontal sections taken on lines 3—3 and 4—4, respectively, of Fig. 1;

Fig. 5 is a bottom plan view of the device;

Figs. 6, 7 and 8 are detailed views of certain of the structural elements thereof; and Fig. 9 is a detail view of the sleeve, the upper portion of which is shown in section.

The device comprises a cylindrical casing 1, one end 2 of which is fully open while the other end 3 is substantially open except for an inwardly flanged part 4. A chuck arranged within the casing adjacent to the end 3 thereof, is formed of two cooperating parts 5 and 6 which rest upon the flange 4. The parts 5 and 6 of the chuck are each substantially semi-circular and together form a circular contractible and expansible nut of less diameter than the inner diameter of the casing. The part 5 is threaded at 7 on its inner side while, preferably, the part 6 is not so threaded. The parts 5 and 6 are both provided with a taper 8 adjacent their upper and outer circumferential edges, above which a spring washer member is arranged upon the upper side of the chuck comprising an annular ring 9 having a pair of downwardly extending portions 10, which are on diametrically opposed sides of the ring and provided with inwardly extending flanges or lugs 11 intermediate their ends, such lugs being disposed at an angle slightly less than 90° to the plane of the portions 10 so that when the chuck is contracted these lugs will be placed under spring tension. The arms 10 extend downwardly alongside of the chuck in such position that the lugs 11 extend into the spaces between the two parts of the chuck, and since the arms 10 of the washer are offset radially from the ring portion 9, the position of the lugs 11 between the parts of the chuck is such that said lugs and washer will exert a spring pressure upon the parts thereof so as to tend to return such parts to their expanded or separated positions. Also it should be noted that the arms 10 of the washer are long enough to extend through suitable openings provided in the flange 4 of the casing and to be held against displacement therein by the flanges 12 turned inwardly from the arms into engagement with the flange 4 of the casing. The casing 1 adjacent its end 2 is provided with a pair of transversely aligned openings for the reception of a pin 13, the purpose of which will be later explained. The casing is also provided with a longitudinal slot extending from the end 2 of the casing to a point substantially below the middle thereof, the upper part 14 of which is larger than the lower part 15.

A cam lever 16 having downwardly extending spaced parallel arms 17 for a portion of its length is pivotally mounted at its inner end upon the pin 13, above mentioned. The inner part of each of the arms 17 has a downwardly extending enlarged portion, the lower edge of which is formed with a cam surface 18, the purpose of which will later become apparent. The outer end of the lever is enlarged to form a thumb rest 19. When this lever is swung to its uppermost position the enlarged downwardly extending parts of the arm 17 are free to move through the enlarged part 14 of the longitudinal slot in the casing, and in the same way, when the lever is swung into its operative or lowermost position, as shown in Fig. 1, the arms 17 may move through such part 14 of the slot.

The casing 1 also carries a sleeve member 20 slidably arranged therein intermediate the lower end of the pin 13 and the chuck. This member 20 is substantially cylindrical and has an enlarged lower portion and a reduced upper portion, the connection between said portions forming an annular shoulder 21, the purpose of which will later be made clear. At the upper end of the reduced upper portion of the member 20 the walls are flanged inwardly to form the annular flange 22 and the central opening 23. The lower enlarged part of such member has a slot 24 extending from its lower edge to a point just below the shoulder 21, and two slots 25 of considerable less length than the slot 24 arranged on opposite sides of the member 20 but having their major protions located on the same side of a median line through the member as is the slot 24. The purpose of these slots will later be made clear.

A member 26 is arranged within the cylindrical member 20 and has a body portion 27 fitting within the enlarged portion of the member 20 and bearing against the under side of the shoulder 21 when the chuck is closed and a reduced central stem portion 28 extending upwardly within the reduced portion of the member 20 through and beyond the opening 23 therein. The member 26 is provided with a tapered radially extending bore 29 adapted to receive a nipple 30 extending through the reduced portion 15 of the slot in the casing and through the elongated slot 24 of the member 20 and connecting the hose line with the device. The under side of the body portion 27 of the member 26 is provided with an annular depression or groove within which is arranged a suitable gasket 31 while the part surrounded by the depression extends outwardly beyond the plane of said lower surface and is provided with a longitudinal bore 32 communicating with the transverse bore 29. The lower surface of the body portion 27 is normally above the lower edge of the sleeve 20, particularly when said portion is in engagement with the under side of the shoulder 21. A spring 33, arranged between the upper side of the body portion and the under side of the flanges 22 of the sleeve 20 surrounds the stem 28, the purpose of which is to normally tend to force said sleeve upwardly within the casing.

When the device is assembled and the lever 16 extends upwardly in continuation of the casing, the sleeve 20 is forced upwardly within the casing by the spring 33, in which position the parts 5 and 6 of the chuck are expanded or separated by the spring action of the lugs 11 carried by the arms 10 of the ring 9. When in this position the device is placed over the inlet valve stem to which it is to be connected and the lever 16 swung downwardly to the position indicated in Fig. 1. This movement of the lever causes the cam surface 18 to engage against the upper side of the sleeve 20 and force said sleeve downwardly within the casing against the tension of the spring 33. This downward movement of the sleeve 20 is permitted since the nipple 30 is normally arranged at the lower end of the elongated slot 24 while the shorter slots 25 provide a clearance for the arms 10 and lugs 11 of the washer 9. As the sleeve 20 moves downwardly within the casing the lower inner edges of said sleeve engage the tapered portions 8 of the chuck members and force or cam such members together thereupon effecting a contraction of the chuck upon the valve stem. When the lever 16 is past a certain point in its downward swinging travel it engages the upper side of the sleeve 20 in a position where the upward thrust thereof is longitudinal thereby holding said sleeve against movement upwardly by the spring 33 and maintaining the parts of the chuck in contracted position.

If the valve stem to which the device is attached is threaded, the threads 7 carried by the part 5 of the chuck will engage in such threads and form a tight connection between the device and the stem. The shoulder 21 provides a stop or limit for the downward movement of the sleeve 20 within the casing while the pivot pin 13 definitely limits any upward movement of the stem 28 of the member 26. It is understood that the valve stem extends upwardly through the clutch and engages the gasket 31, so that the downwardly extending central portion is received therein and the bore 32 registers with the valve bore.

Although a preferred embodiment of the invention has been illustrated and described, it should be understood that the invention is not limited thereto, but is susceptible of such modifications and adaptations as fall within the scope of the appended claims.

Having thus described my invention, I claim:

1. A device of the character described comprising a casing, a contractible chuck arranged at one end of said casing adapted to engage the inlet stem of the receptacle to which the device is to be attached and having a portion of its circumference provided with a taper, an operating member connected with said casing, and a slidable member in said casing intermediate said operating member and said chuck adapted to be moved by the former into engagement with the tapered portion of the latter for contracting the same and clamping the device to the stem.

2. A device of the character described comprising a casing, a two-part contractible chuck arranged at one end of said casing adapted to engage the inlet stem of the receptacle to which the device is to be attached and having a portion of its circumference provided with a taper, a pivoted cam operating member connected with said casing at the opposite end thereof, and a slidable sleeve arranged in said casing intermediate said operating member and said chuck and normally held out of engagement with the latter adapted to be pressed into engagement with the tapered portion of the chuck by movement of the operating member in one direction to thereby contract the chuck and clamp the device to the said inlet stem.

3. A device of the character described comprising a casing, one end of which carries a contractible chuck and the other end of which is provided with a pivoted cam operating lever, a slidable sleeve arranged within said casing intermediate said chuck and said lever, a member arranged within said sleeve adapted to be connected to the supply hose and to the inlet stem of the receptacle to which the device is to be attached, a spring intermediate a portion of said member and said sleeve for normally maintaining the latter out of engagement with the chuck, and means on said chuck for enabling the sleeve to contract the same when pressed into engagement therewith by the cam operating lever.

4. A device of the character described, comprising a casing having a contractible chuck at one end and an operating means at its other end, said chuck being provided with means tending to normally maintain the parts thereof in separated position and having a portion formed with a taper, a sleeve slidably arranged in said casing intermediate said chuck and said operating means, a member within said sleeve having an enlarged portion adapted to be connected with a hose line and with the valve stem to which the device is to be attached and a reduced stem portion extending upwardly beyond said sleeve and a spring arranged within said sleeve between the upper side thereof and the upper side of the enlarged portion of said member and surrounding the reduced stem portion thereof to normally maintain said sleeve out of engagement with said chuck, said operating means being adapted to force said sleeve downwardly against the tension of said spring into engagement with the taper of the chuck to contract the same into clamping engagement with a valve stem.

In testimony whereof, I hereunto affix my signature.

JOHN C. CROWLEY.